United States Patent
Holzl (10) Patent No.: US 9,506,746 B2
(45) Date of Patent: Nov. 29, 2016

(54) DEVICE FOR DETERMINING THE LOCATION OF MECHANICAL ELEMENTS

(71) Applicant: Pruftechnik Dieter Busch AG, Ismaning (DE)

(72) Inventor: Roland Holzl, Munich (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 290 days.

(21) Appl. No.: 14/257,753

(22) Filed: Apr. 21, 2014

(65) Prior Publication Data

US 2014/0327761 A1    Nov. 6, 2014

(30) Foreign Application Priority Data

May 6, 2013 (DE) .......................... 10 2013 007 662

(51) Int. Cl.
    *G01B 11/14* (2006.01)
    *H04N 5/225* (2006.01)
    *G01B 11/27* (2006.01)

(52) U.S. Cl.
    CPC ............ *G01B 11/14* (2013.01); *G01B 11/272* (2013.01); *H04N 5/2253* (2013.01); *H04N 5/2254* (2013.01)

(58) Field of Classification Search
    CPC ..................................................... G01B 11/14
    See application file for complete search history.

(56) References Cited

U.S. PATENT DOCUMENTS

| | | | |
|---|---|---|---|
| 6,040,903 A | 3/2000 | Lysen et al. | |
| 6,411,375 B1 * | 6/2002 | Hinkle | G01B 11/272 33/286 |
| 6,476,914 B1 * | 11/2002 | Hoelzl | G01B 11/26 250/208.2 |
| 6,873,931 B1 | 3/2005 | Nower et al. | |

FOREIGN PATENT DOCUMENTS

| | | |
|---|---|---|
| DE | 3335336 A1 | 4/1984 |
| DE | 3320163 A1 | 12/1984 |
| DE | 3814466 A1 | 11/1989 |
| DE | 3911307 A1 | 10/1990 |
| DE | 4041723 A1 | 6/1992 |
| DE | 19747872 A1 | 5/1999 |
| DE | 10117390 A1 | 10/2002 |
| DE | 10143812 A1 | 3/2003 |
| DE | 10252082 A1 | 5/2004 |
| DE | 102006023926 A1 | 11/2007 |
| DE | 102008037176 A1 | 3/2010 |

(Continued)

*Primary Examiner* — Dave Czekaj
*Assistant Examiner* — Berteau Joisil
(74) *Attorney, Agent, or Firm* — Barlow, Josephs & Holmes, Ltd.

(57) ABSTRACT

The invention relates to a device for determining the location of a first mechanical element (10) and a second mechanical element (12) with respect to each other, having a first measurement unit (14) for positioning at the first mechanical element, a second measurement unit (18) for positioning at the second mechanical element, and an analysis unit (22), wherein the first measurement unit has means (24) for producing at least one light beam bundle (28, 30), a scattering surface (34) for scattering the light (WV, PV) impinging on the scattering surface, and a camera (36) for recording images of the scattering surface, wherein the second measurement unit has a reflector arrangement (38), which faces the first measurement unit when the measurement units are positioned at the respective mechanical element so as to reflect the light beam bundle (28', 28") onto the scattering surface.

15 Claims, 6 Drawing Sheets

(56) References Cited

FOREIGN PATENT DOCUMENTS

| EP | 0962746 | A2 | 12/1999 |
| EP | 1154229 | A2 | 11/2001 |
| EP | 1211480 | A2 | 6/2002 |
| EP | 2093537 | A1 | 8/2009 |
| WO | 9736146 | A1 | 10/1997 |
| WO | 0028275 | A1 | 5/2000 |
| WO | 03067187 | A1 | 8/2003 |
| WO | 2010042039 | A1 | 4/2010 |

* cited by examiner

DEVICE FOR DETERMINING THE LOCATION OF MECHANICAL ELEMENTS

BACKGROUND OF THE INVENTION

The invention relates to a device for determining the location of a first mechanical element and a second mechanical element with respect to each other, with a first measurement unit for positioning at the first mechanical element and a second measurement unit for positioning at the second mechanical element as well as an analysis unit.

Such a device can be designed, for example, for determining the alignment of two shafts with respect to each other.

Typically, in the case of such alignment measurement devices, at least one of the two measurement units has a light source for producing a light beam whose point of impingement on one or a plurality of detectors at the other measurement unit or on a detector at the measurement unit provided with the light source is determined, with the other measurement unit reflecting back the light beam in the latter case. Typically, for determination of the alignment of the shafts with respect to each other, the location of the point of impingement of the light beam is determined in a plurality of rotational angle positions, for which purpose the measurement units are displaced along the peripheral surfaces of the shafts or the shafts are rotated together with the measurement units positioned at the peripheral surfaces.

Described in DE 33 20 163 A1 and DE 39 11 307 A1 are shaft alignment measurement devices in which the first measurement unit emits a light beam, which is reflected back from a mirror prism of the second measurement unit onto an optical detector of the first measurement unit.

Described in DE 33 35 336 A1 is a shaft alignment measurement device in which both the first measurement unit and the second measurement unit each emit a light beam and each has an optical detector, with the respective light beam being directed onto the detector of the other measurement unit.

A shaft alignment measurement device operating according to this principle is described also in U.S. Pat. No. 6,873,931 B1, with the two measurement units each being provided with two biaxial acceleration sensors for automatically detecting the rotational angle of the shaft.

Known from DE 38 14 466 A1 is a shaft alignment measurement device in which the first measurement unit emits a light beam, which impinges on two optical detectors of the second measurement unit, which are arranged behind one another in the axial direction.

Known from WO 03/067187 A1 is a shaft alignment measurement device in which the first measurement unit emits a fan-shaped beam, which impinges on two optical detectors of the second measurement unit, which are arranged behind one another in the axial direction.

Known from WO 00/28275 A1 is a shaft alignment measurement device in which two measurement units are attached to a front side of each of the two shafts, with the first measurement unit emitting a fan-shaped light beam, which impinges laterally on three marker pins arranged in a plane of the second measurement device.

Described in EP 0 962 746 A2 is a shaft alignment measurement device in which the first unit has a source for a light beam in a first color, a beam splitter, and a color-sensitive CCD detector and the second unit has a source for a light beam in a second color and a color separator (color-selective beam splitter), which is reflecting for the first color and transmitting for the second color, with the light source of the second unit being arranged behind the color separator as viewed from the first unit, and the light source of the first unit being arranged behind the beam splitter as viewed from the second unit. The light beam emitted from the first unit initially passes through the beam splitter of the first unit and is then reflected at the color separator of the second unit, with this reflected beam being reflected, in turn, at the beam splitter of the first unit so as to reach the detector. The light beam from the second unit initially passes through the color separator of the second unit and is reflected by the beam splitter of the first unit onto the detector.

Described in EP 2 093 537 A1 is a shaft alignment measurement device in which the first measurement unit emits a fanned-out light beam, which impinges on two optical strip detectors of the second measurement unit, which are arranged laterally spaced and parallel to each other, with the lengthwise direction of the detectors being arranged perpendicularly to the fanned plane of the light beam.

For all of the shaft alignment measurement devices assessed here, the point of impingement of a light beam on a detector surface is determined and analyzed in each case.

Known from DE 40 41 723 A1 is a device for determining the position of a measurement point relative to a reference point for guiding or controlling the advance of a bore, said device having a plurality of measurement stations, which are arranged in the bore or at the bore head and each of which has a camera with a marking, with each camera recording the marking of the adjacent camera or measurement station.

Known from WO 2010/042039 A1 is a shaft alignment measurement device in which each of the two measurement units is provided with a camera arranged in a housing, with the side of the housing facing the other unit being provided with an optical pattern, which is recorded by the opposite-lying camera. The side of the housing provided with the pattern is provided in each case with an opening, through which the opposite-lying pattern is imaged. In an alternative design, one of the two units is provided only with a camera, but not with a pattern, whereas the other unit does not have a camera, but is provided with a three-dimensional pattern.

Described in EP 1 211 480 A2 is a shaft alignment measurement device in which the first measurement unit is provided with a light source, which directs a light beam onto the second measurement unit, which is provided with a matt screen; the side of the matt screen facing away from the first measurement unit is imaged by means of appropriate optics onto an image detector also forming a part of the second measurement unit.

Described in DE 101 43 812 A1 and DE 101 17 390 A1 is a shaft alignment measurement device in which the first measurement unit has a light source for producing a fanned-out beam and the opposite-lying second measurement unit has a partially reflecting optical system with a rearward matt screen and a camera, which records the side of the matt screen facing away from the first measurement unit with a primary light spot of the beam coming directly from the light source and with a secondary light spot of the beam reflected from the partially reflecting optical system of the second measurement unit and a reflector on the front side of the first measurement unit.

A laser receiver with camera for machine measurement is available from the company Wente CamSorik GmbH, 38108 Braunschweig, Germany, under the trade name LaserTrac.

SUMMARY OF THE INVENTION

The problem of the present invention is to create a device for determining the location of two mechanical elements with respect to each other, in particular for shaft alignment measurement, the design of said device being especially simple, flexible, and low cost. A further problem of the invention is to create a corresponding method.

This problem is solved by the device and method of the present invention.

In the solution according to the invention, it is advantageous that, through the use of a camera and a scattering surface that is imaged on the camera, instead of using an optical detector on which the reflected light beam bundle impinges directly, an especially simple and flexible system can be realized. In particular, it is possible to use as the camera a mass-produced product designed for end users, such as, for example, a photographic camera or a smartphone, which may be obtained at relatively low cost or are already available anyhow to the user for other reasons.

Preferably, the device is designed so that the camera is directed onto the side of the scattering surface facing the reflector arrangement.

According to an embodiment of the invention, the camera can move freely with respect to the two measurement units and can be used in a freehand manner, for example, in order to image the scattering surface onto the camera. According to an alternative embodiment, the camera can be designed as part of the measurement unit, which also has means for producing the light beam bundle, or it can be attached to this measurement unit.

BRIEF DESCRIPTION OF THE DRAWINGS

The invention will be explained in more detail below on the basis of the attached drawings. Shown are.

DETAILED DESCRIPTION OF THE INVENTION

Figure 1:
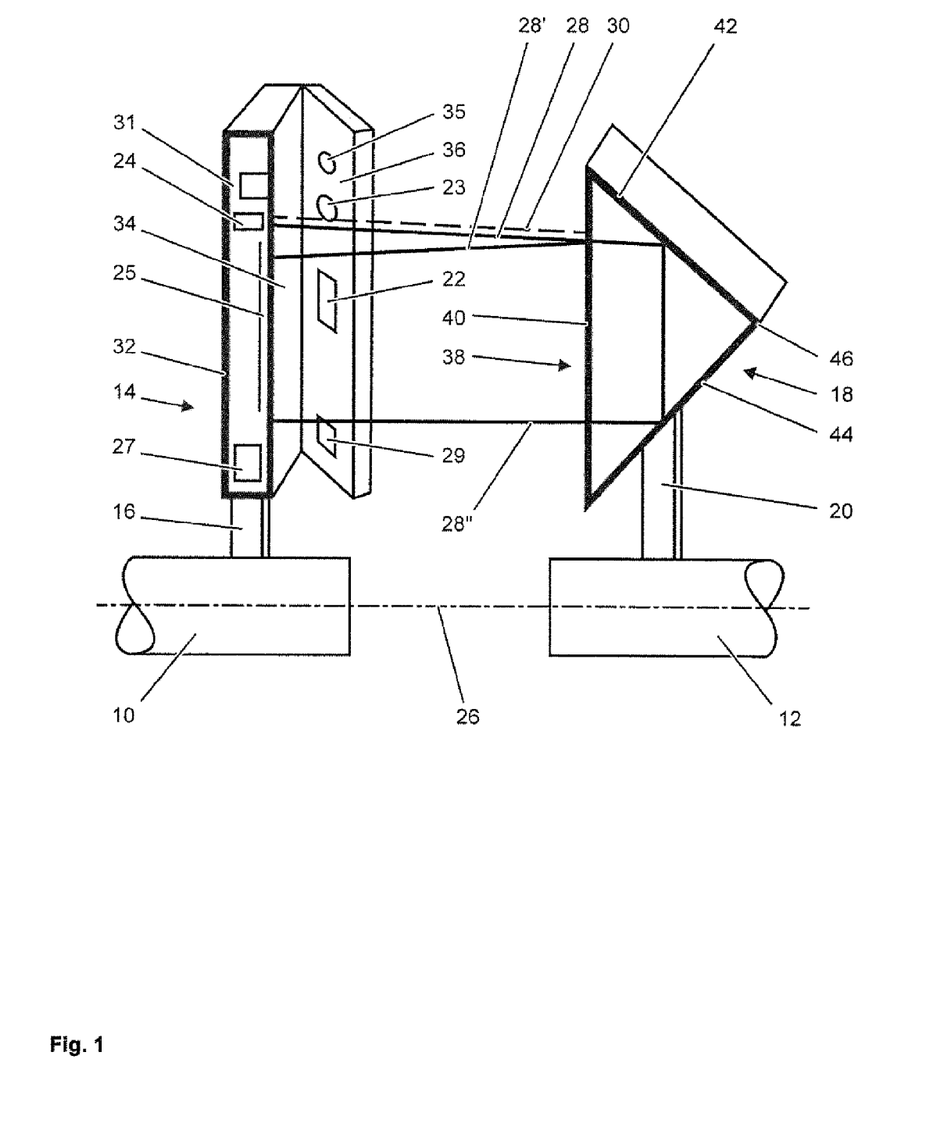
FIG. 1 a lateral, slightly perspective view of a first example of a location determination device according to the invention.
Figure 2:
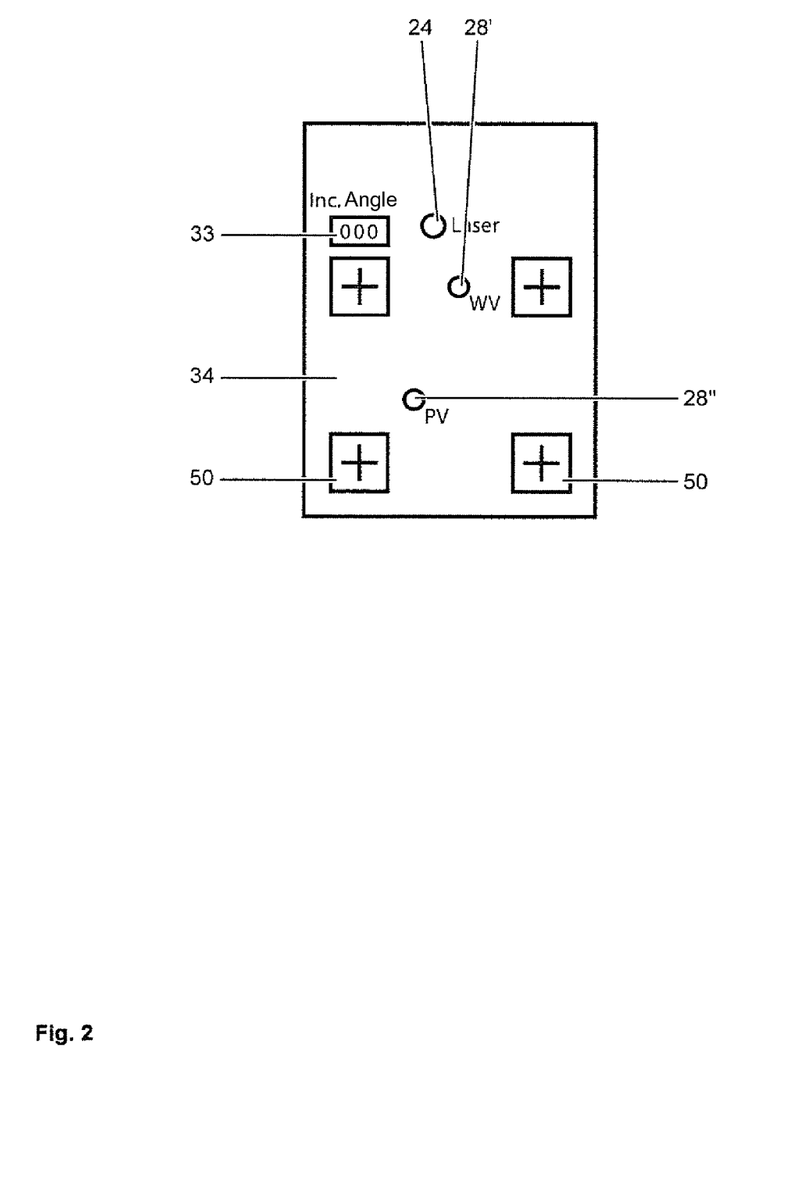
FIG. 2 a front view of the scattering surface of the device of FIG. 1.
Figure 3:
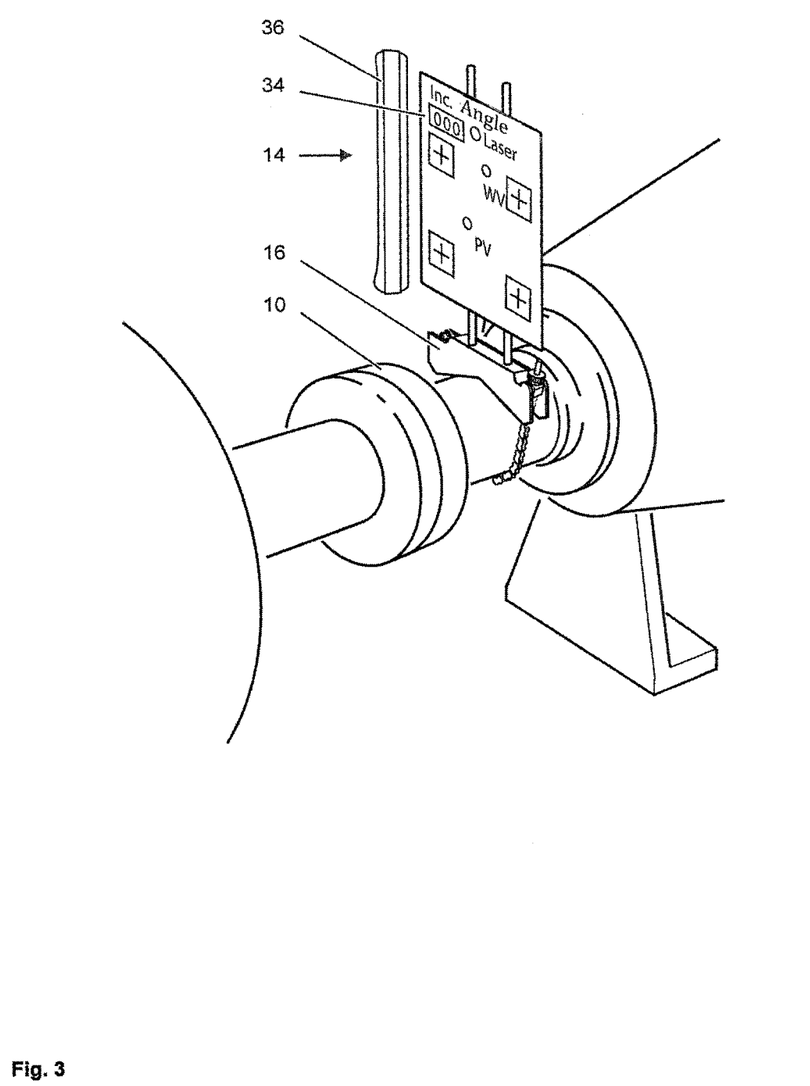
FIG. 3 a perspective view of the measurement unit of the device of FIG. 1, provided with the scattering surface, in practical use.

Shown in FIGS. 1 to 3 is a first example of a device according to the invention for determining the alignment of a first shaft 10 of a machine (not shown) and a second shaft 12 of a machine (not shown) with respect to each other. The device comprises a first measurement unit 14 with an element 16 for positioning at a peripheral surface of the first shaft 10 as well as a second measurement unit 18 with an element 20 for positioning at the peripheral surface of the second shaft 12.

The two shafts 10 and 12 are arranged consecutively as aligned as possible with respect to a reference axis 26, with the device having the two measurement units 14, 18 serving to determine any angular offset and/or parallel offset with respect to the reference axis 26 or with respect to each other.

Typically, the device also comprises means for displaying the result regarding angular offset or parallel offset (not illustrated in the figures).

The first measurement unit 14 comprises a light source 24 for producing a light beam bundle 28, a collimator (not illustrated) for collimating the light beam bundle 28, a scattering surface 34, and a camera 36 for taking pictures of the scattering surface 34.

The camera 36 has optics 35 in order to image the scattering surface 34 onto a camera sensor (not illustrated). The camera 36 can be attached at a lateral angle obliquely to the scattering surface 34, for example, so as not to prevent the impingement of a light beam reflected at the second measurement unit 18, at least in the central region of the scattering surface 34.

The scattering surface 34 faces the second measurement unit 18 when the two measurement units 14, 18 are situated in a measurement position. The light source 24 can be arranged behind the scattering surface 34 as viewed from the second measurement unit 18, for example, and the light beam bundle 28 can radiate through a corresponding opening in the scattering surface 34.

The second measurement unit 18 has a reflector arrangement 38, which has a front surface 40 facing the first measurement unit 14 and a first rearward surface 42 as well as a second rearward surface 44, with the rearward surfaces 42, 44 being arranged at an angle, typically a right angle with respect to each other and thereby forming between them a roof edge 46; in the examples shown, the reflector arrangement is designed as a so-called Porro prism (also referred to as a "roof prism"), with the two parallel side faces of the prism being formed by congruent right-angled triangles, which are joined by the boundary faces lying perpendicular to the triangle faces. The roof edge 46 is essentially tangential to the peripheral surfaces of the shafts 10, 12.

The front surface 40 is designed as a partially reflecting surface for the light beam bundle 28, with a first part 28' of the light beam bundle being reflected by the front surface 40 in the direction of the scattering surface 34, while a second part 28" of the light beam bundle 28 is transmitted through the front surface 40 in the direction of the first rearward surface 42 so as to be reflected at the first rearward surface 42 toward the second rearward surface 44 and from there through the front surface 40 in the direction of the scattering surface 34.

In the example of FIG. 1 and FIG. 2, the points of impingement (that is, the light spots) of the light beam bundle 28' or 28" on the scattering surface 34 are labeled WV or PV, respectively. Preferably, the reflectivity of the front surface 40 for the light beam bundle 28 is chosen such that the intensities of the two reflected light beam bundles 28' and 28" differ, as a result of which the two points of impingement WV and PV can be distinguished on the scattering surface 34.

According to a modified embodiment, the arrangement of FIGS. 1 and 2 can be equipped with a light source 24, which, in addition to the first light beam bundle 28, can emit a second light beam bundle 30 (illustrated by a broken line in FIG. 1), with the two light beam bundles 28, 30 being radiated essentially in the same direction, but differing spectrally (for example, the light source 24 can be designed as a dual-wave laser diode, which emits a light beam bundle at about 660 nm in the red region and a light beam bundle at about 780 nm in the infrared region; alternatively, the light source 24 can also have two differently colored laser diodes).

In this case, the front surface 40 of the reflector arrangement 38 is designed as a color separator, with it being possible to design it to be more strongly reflecting for the first light beam bundle 28 than for the second light beam bundle 30 and correspondingly more strongly transmitting for the second light beam bundle 30 than for the first light beam bundle 28. The reflected light beam bundle, labeled 28" in FIG. 1, then corresponds to the second light beam bundle 30 once it has been transmitted by the front surface 40 and reflected by the two rearward surfaces 42, 44. The light beam bundle labeled 28' in FIG. 1 then corresponds to the first light beam bundle 28 reflected at the front surface 40.

In this way, the two points of impingement WV and PV differ in their spectral composition and can be easily distinguished by means of a color-sensitive camera 36.

For the arrangement shown in FIGS. 1 and 2, the point of impingement WV of the light beam bundle 28', reflected at the front surface 40, is a measure of the angular offset of the two shafts 10, 12, and the point of impingement PV of the light beam bundle 28" reflected at the two rearward surfaces 42, 44 is a measure of the parallel offset of the two shafts 10, 12.

Behind the scattering surface 34 (as viewed from the second measurement unit 18), the first measurement unit 14 has a housing 32, which contains the light source 24 and the associated electronics. The light source 24 preferably is pulsed in a randomized manner in order to minimize any oscillation sensitivity. Furthermore, the housing 32 contains the power source (batteries or rechargeable batteries) for the light source 24 in addition to suitable power management electronics. Overall, the housing 32 should not be appreciably thicker than the holding rods typically provided for attachment to the positioning element 16 (not shown in FIG. 1).

The first measurement unit 14 preferably has an inclinometer to determine the angle of inclination of the first measurement unit 14 and hence the rotational angle position of the shaft 10 provided with the first measurement unit 14. Such an inclinometer 31 with a display 33 can be integrated in the housing 32, for example; see FIGS. 1 and 2. In this case, the inclinometer 31 can be designed, for example, as an MEMS inclinometer.

The first measurement unit 14 is preferably designed such that the light beam bundle or light beam bundles 28, 30 are directed without interposition of a reflecting element onto the reflector arrangement 38 of the second measurement unit 18: that is, no reflecting elements are arranged between the light source 24 and the reflector arrangement 38.

According to FIG. 2, the scattering surface 34 is provided with measurement markers 50, which can be designed as crosses, for example, in order to facilitate the analysis of the images of the scattering surface 34 taken by the camera 36. In order that the markings 50 are also visible in darker surroundings, it is possible to provide an external light source, for example, such as an LED 23, on the camera 36. Alternatively, a backlighting 25 of the scattering surface 34 could be provided. In this case, a metal foil with appropriate cutouts could be attached adhesively to a milk glass surface (made of glass or plastic), with injection of diffuse white light via the housing 32.

Preferably, the scattering surface 34 is designed to be essentially flat. According to FIGS. 1 and 3, the camera 36 can be arranged laterally displaced and tilted with respect to the scattering surface 34. In this case, the camera 36 can also be mounted, for example, below on the positioning element 16 (which can be a chain-tensioning device, for example).

The camera 36 is oriented in this case so that it images the scattering surface 34 as completely as possible on the camera sensor, but the reflected light beam bundles 28', 28" are not shadowed. In this case, a scattered light aperture (not shown) could also be provided, which could be used advantageously also for mechanical stabilization of the camera 36 and the scattering surface 34.

The camera 36 can be designed, for example, as a compact camera or as a smartphone or mobile phone camera. Preferably, the optics 35 involve a fixed lens, because such a lens is more stable than a zoom lens. Preferably, the resolution of the camera sensor is at least 8 megapixels. The camera is operated preferably in the macro setting.

Insofar as the camera is designed as a smartphone, the display of the smartphone can be used advantageously as a graphic user interface (GUI); otherwise, an additional device of this kind, such as, for example, a smartphone or a tablet computer, could be used additionally for user control. In this case, it is possible to also use, for example, voice control with a headset or the "Google Glass" expected in 2013.

The analysis of the images taken by the camera can be carried out as follows: The goal of the analysis is to determine the respective middle point coordinates of the points of impingement BV and PV of the reflected light beam bundles 28' and 28", respectively. In this process, the image taken is initially rectified; that is, the perspective distortion and any distortions of the optical system caused by the laterally tilted arrangement of the camera 36 will be compensated for. This can occur, for example, on the basis of measurement markings 50, the "global coordinates" of which are known exactly. The point of impingement of the light stream bundles 28' and 28" can be separated from the background on the basis of color, so that the region for the middle point determination is limited. The midpoint determination by means of a center-of-gravity estimation then occurs. Because the global coordinates of the measurement markings 50 are known exactly, the pixel coordinates can be calculated, so that the midpoint of the points of impingement WV and PV of the light beam bundles can be determined in global coordinates.

Figure 5:
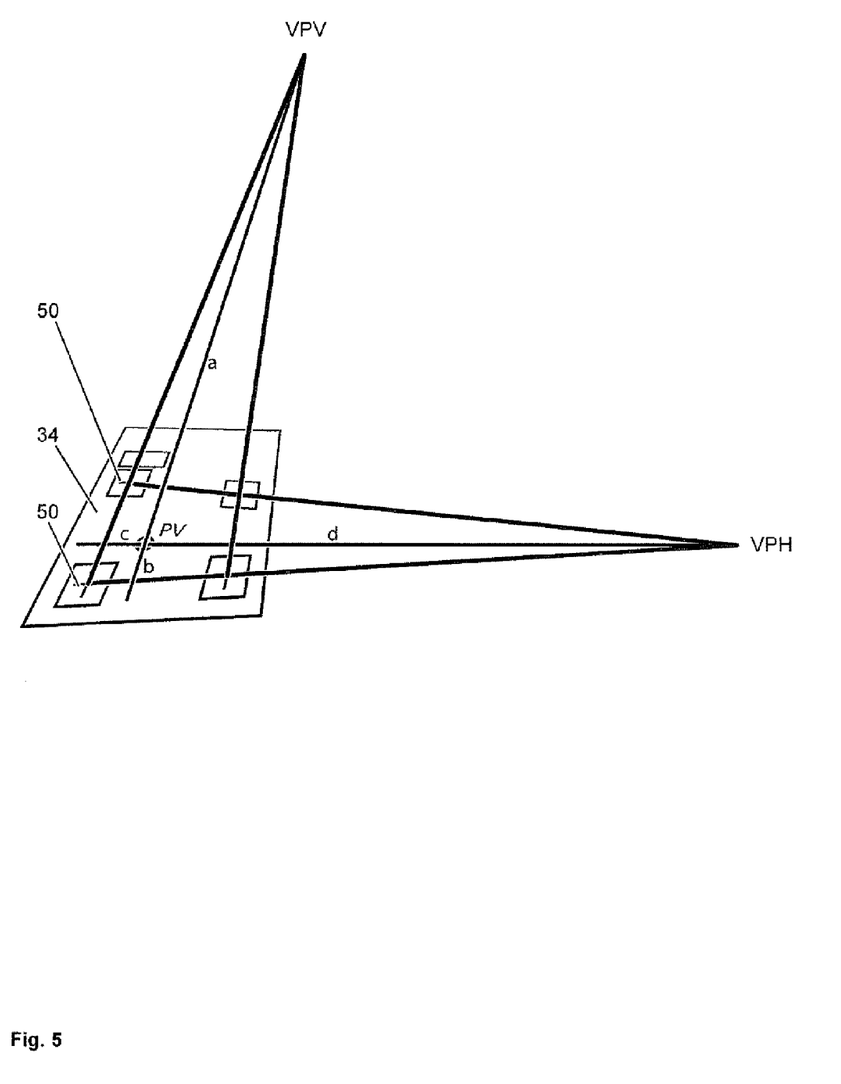
FIG. 5 a schematic illustration of how the intercept theorem can be used to correct a perspective distortion of the image of the scattering surface on the camera.

Another possibility is the use of the intercept theorem to calculate the coordinates of the points of impingement, as is indicated schematically for the point of impingement PV in FIG. 5. In this case, the horizontal vanishing point VPH and the vertical vanishing point VPV are used.

It is also possible to determine the mean diameter of the points of impingement PV and WV of the light beam bundles and to use these to estimate the distance between the light source and the reflector arrangement, that is, between the first measurement unit 14 and the second measurement unit 18.

Insofar as the first measurement unit 14 has a display 33 for the angle of inclination measured by an inclinometer 31, the camera 36 is preferably provided with an OCR function in order to register the value of this angle; alternatively, a transmission of the angle value directly to the camera 36 can take place via, for example, a Bluetooth link.

Insofar as the camera 36 is a smartphone, the inclinometer 29 that is usually integrated in it can also be used for determining the angle of inclination.

During analysis of the pictures taken by the camera, it is also possible to correct systematic distortions, such as those caused by the prism edge 46, for example.

The analysis of the images can be conducted in an analysis unit indicated schematically by reference 22, which can constitute a part of the camera, particularly when what is involved is a smartphone, which is inherently already factory-equipped anyhow with a relatively large computing power.

Prior to start of a measurement, the two measurement units 14, 18 are initially adjusted with respect to each other so that the reflected light beam bundles 28', 28" impinge roughly at the center of the scattering surface 34. For this purpose, the second measurement unit 18, for example, can be provided with a height adjuster (not shown) for shifting the position of the second measurement unit 18 in the radial direction with respect to the shaft 12 and an angle adjuster for tilting the second measurement unit 18 with respect to the radial direction of the shaft 12 and an adjustment of the second measurement unit 18 around the radial direction.

Once adjustment of the two measurement units 14, 18 with respect to each other has been completed, the positions of impingement of the reflected beam bundles 28', 28" indicate in principle the misalignment of the two shafts 10 and 12 with respect to each other when the two shafts 10 and 12, together with the measurement units 14, 18 situated on them, are rotated around the axis 26, with the course of the respective point of impingement then being followed depending on the rotational angle (which, in turn, can be determined by means of the inclinometer function) and being analyzed in the known way so as to determine the vertical offset, horizontal offset, and the angular offset of the shafts 10, 12 (such a method is described in DE 39 11 307 A1, for example, for a single beam bundle).

If the reflector arrangement 38 is designed as a triple prism, the position of impingement of the beam bundle 28" reflected at the rearward surfaces 42, 44 indicates the parallel offset in both directions.

After determination of the misalignment, an adjustment of the shafts 10, 12 is performed in a specific angular position, with measurement being conducted during the shaft adjustment in order to establish when the misalignment is best corrected. Such a method is also described in DE 39 11 307 A1, for example.

When a triple prism is used, the adjustment of the shafts can occur in the "12 o'clock" position of the two measurement units 14, 18, for example. When a Porro prism (also referred to as a "roof prism") is used, the adjustment can occur in the 3 o'clock or 9 o'clock position, for example.

Typically, during the alignment measurement and during the adjustment of the shafts, images of the scattering surface 34 are to be taken and analyzed continually by the camera at a relative high rate, with it being possible to produce and process five images per second, for example. Insofar as the camera is a smartphone, the taking and analysis of images can be carried out in the form of an appropriate app, for example.

As an alternative to continually taking images, the image-taking mode can also be chosen, for example, such that images are taken depending on the current angle of inclination, for example whenever the angle is altered by a specific increment—for example, 1°.

The alignment device can optionally comprise a Bluetooth headset, which is worn by the operator carrying out the adjustment of the shafts during the adjustment and which serves for wireless reception of the current offset values determined by the analysis unit 22 of the camera 36, designed as a smartphone, so as to serve audibly the person carrying out the adjustment of the shafts. This is insofar advantageous as, during the adjustment, it is typically difficult for the operator to read the display of the smartphone 36. In this case, the headset could also be used in order to utilize the Bluetooth link for voice control of the smartphone 36.

Alternatively, a second smartphone or a tablet computer could be used by the operator in order to present the display of the smartphone 36 serving as the camera via a Bluetooth link (for example, by means of VNC) in a form that can be better read by the operator, with it also being possible to control the smartphone 36 via the second smartphone or the tablet computer by means of touch display; see also WO 97/36146.

Typically, the imaged surface has a size of about 40×40 mm, in which case one pixel corresponds to about 20 μm when the resolution of the camera is 8 megapixels (corresponding to a vertical resolution of about 2500 pixels). When a compact camera with 16 megapixels, for example, is used, a resolution of about 7 μm can be achieved.

It is basically possible also to use a camera with special optics or, in the case of a smartphone, to use an interposed magnifier. The dimensions of the scattering surface 34 to be imaged can also be reduced, for example, to 20×20 mm to 30×30 mm.

In this case, it is basically conceivable for the images of the camera to be transmitted wirelessly (for example, via WLAN) to a mobile platform, for example. It is possible here to use a special SD card, for example.

According to a modification of the embodiment of FIGS. 1 to 3, the camera 36 can be designed as a "free camera," which can move freely with respect to the two measurement units 14, 18 and is held in the hand of the operator for taking the picture of the scattering surface 34, for example, or else mounted on a tripod. In this case, the camera can be operated either in the macro setting and positioned appropriately close to the scattering surface 34 when pictures are taken or else, where this is not possible or not desired, the camera is operated with a telephoto lens, so that images can also be taken at a distance of greater than 1 m, for example.

Figure 4:
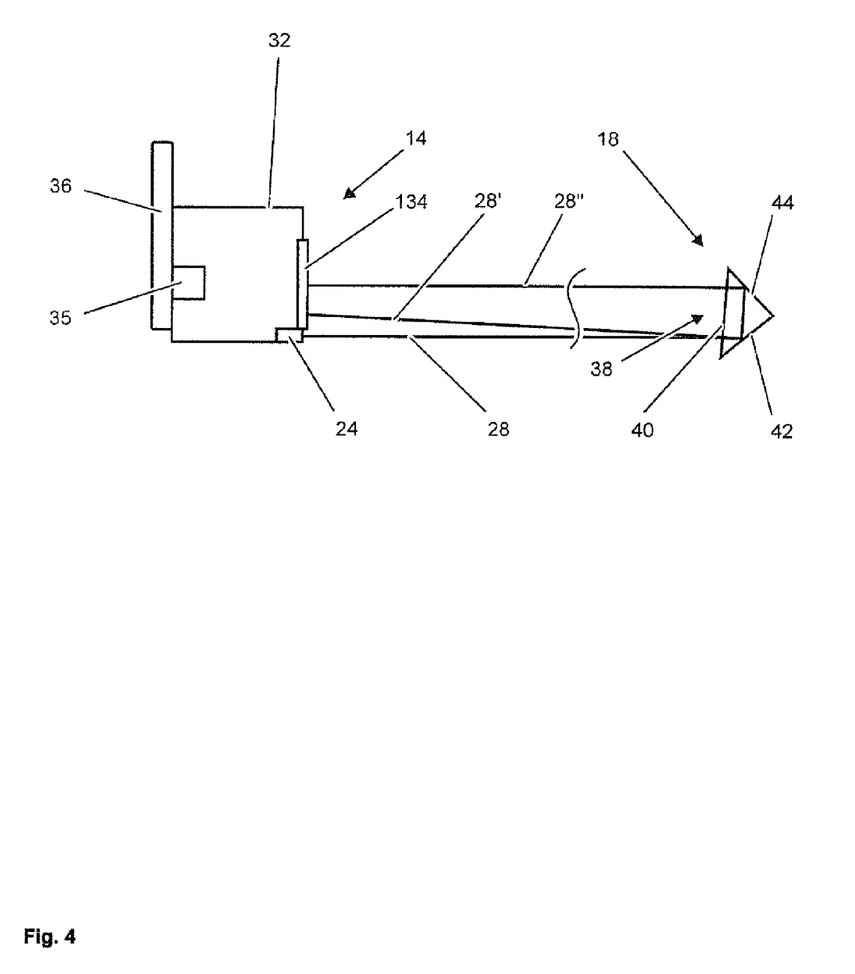
FIG. 4 a schematic side view of another embodiment of a location determination device.

Shown in FIG. 4 is another modification of the embodiment of FIGS. 1 to 3 in which the scattering surface 134 is designed as a matt screen and the camera 36 does not record the side of the scattering surface facing the second measurement unit 18, as in the case of the embodiment of FIGS. 1 to 3, but rather the side of the scattering surface 134 facing away from the second measurement unit 18. In this case, the camera 36, as viewed from the second measurement unit 18, is arranged behind the matt screen 134. In the example shown in FIG. 4, the camera 36 is fixed in place on the housing 32 of the first measurement unit 14. In the case of a commercially available smartphone, this would result in a minimal distance between the camera and the matt screen of about 50 to 60 mm. This distance can be shortened if the camera is provided with an ancillary lens (wide-angle or magnifier).

Here, too, a mobile operating element via a wireless connection, such as, for example, Bluetooth, could communicate with the camera 36. Also in the case of the embodiment of FIG. 4, it is possible to use a scattered light aperture (not shown).

Preferably, in the case of the embodiment of FIG. 4, the light source 24 is two-colored and the front surface 40 is designed as a color separator, as has already been described in connection with the embodiment in FIGS. 1 to 3.

Basically, the camera can be joined to the first measurement unit 14, even in cases in which, during recording, it is mounted on the first measurement unit 14 in a fixed position, in such a way that after alignment measurement and adjustment have been completed, it can be detached from the first measurement unit 14 and used elsewhere. This is particularly advantageous in the case when the camera is a smartphone.

Basically, the use of smartphones as camera offers many advantages: Thus, such devices are very flexible and powerful in terms of programming and design of the graphic user interface; in particular, things such as gesture recognition, keyboard overlay, and localization are possible. Furthermore, the user carrying out the alignment measurement can use a device whose operation he is already basically familiar with anyhow. Moreover, smartphones offer many interfaces, such as, for example, also those in a maintainer database; in particular, in this case, wireless interfaces are available, which can be used for linking to another mobile operating platform, a headset (with echo and noise suppression), Google Glass, a vibrating belt, etc. Furthermore, the smartphone can be used in the usual way at times when it is not used for alignment measurement.

According to an embodiment of the invention, the scattering surface can be provided with a plurality of two-dimensional optical codes—such as, for example, a QR code—which are distributed over the scattering surface, typically in the manner of a grid, which are imprinted on the scattering surface and serve for coding of information/data regarding the scattering surface or the measurement unit provided with the scattering surface, such as, for example, the serial number of the measurement unit, the dimensions of the scattering surface in the x and y direction (for example, in mm), correction factors regarding the precision or errors of the printer used for imprinting the scattering surface (for example, amount of extension or compression in the x and y direction), the number of codes on the scattering surface, the position of the respective code in the grid (row number, column number), as well as the distance of the respective code from the origin of the coordinate system of the scattering surface (for example, in μm). In this case, the individual codes can be arranged, for example, in such a way that they are adjacent to one another so as to cover the entire scattering surface; see, for example, FIG. 6, where four codes 60A, 60B, 60C, 60D are shown. The number and resolution of the codes should be optimized in correspondence to the resolution of the printer and the camera. Instead of a QR code, it is basically possible to use other proprietary graphic codes as well.

Figure 6:
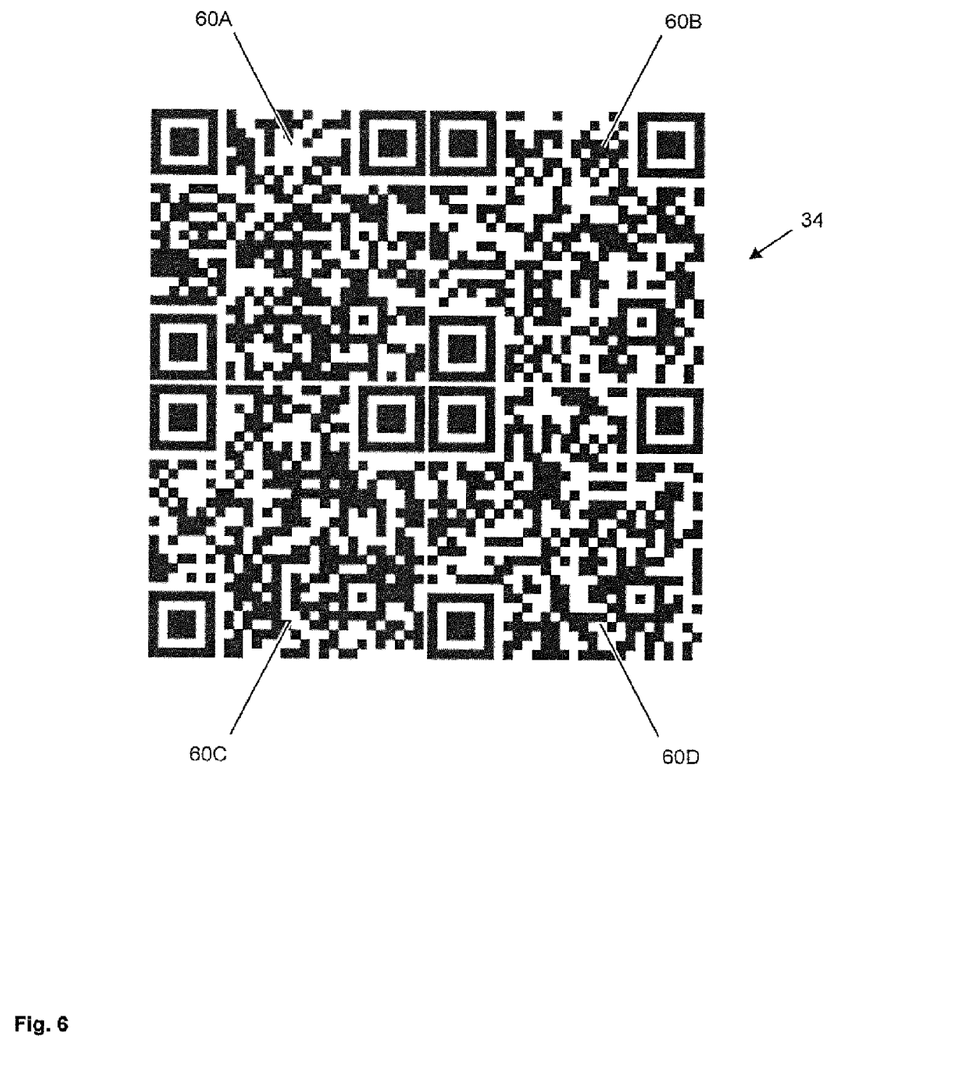
FIG. 6 an example of a scattering surface provided with four QR codes.

The provision of graphic codes on the scattering surface has the following advantages: The entire reflector surface together with protective edge does not need to be photographed, which means facilitation for the user. The codes can be reconstructed to produce a target image, so that sufficient points are available for linearization of the image of the scattering surface (inner and outer parameters). The codes on the scattering surface can be identified as such on the basis of specific markings. A higher precision in determining the position of impingement can be achieved. The scattering surface can be corrected in regard to the precision of the printer used for imprinting of the scattering surface.

It would be appreciated by those skilled in the art that various changes and modifications can be made to the illustrated embodiments without departing from the spirit of the present invention. All such modifications and changes are intended to be covered by the appended claims.

What is claimed is:

1. A device for determining the location of a first mechanical element (10) and a second mechanical element (12) with respect to each other, having a first measurement unit (14) for positioning at the first mechanical element, a second measurement unit (18) for positioning at the second mechanical element, and an analysis unit (22),
wherein the first measurement unit is configured and arranged to produce at least one light beam bundle (28, 30), a scattering surface (34) for the scattering of light (WV, PV) impinging on the scattering surface, and a camera (36) for taking images of the scattering surface,
wherein the second measurement unit has a reflector arrangement (38), which faces the first measurement unit when the measurement units are positioned at the respective mechanical element so as to reflect the light beam bundle (28', 28") onto the scattering surface, and
wherein the analysis unit is configured and arranged to determine from image data supplied by the camera the position of impingement of the light beam bundle, reflected at the reflector arrangement, onto the scattering surface and from it the location of the first mechanical element and the second mechanical element with respect to each other.

2. The device according to claim 1, wherein the camera (36) is directed onto the side of the scattering surface (34) facing the reflector arrangement (38) or in that the camera (36) is directed onto the side of the scattering surface (34) facing the reflector arrangement (38) and is arranged laterally displaced with respect to the scattering surface (34) or in that the camera (36) is directed onto the side of the scattering surface (34) facing the reflector arrangement (38) and is arranged laterally displaced and tilted with respect to the scattering surface (34) or in that the scattering surface is designed as a matt screen (134), with the camera (36) being directed onto the side of the matt screen facing away from the reflector arrangement.

3. The device according to claim 1, wherein the first measurement unit (14) is configured and arranged for the detachable fastening of the camera (36).

4. A device for determining the location of a first mechanical element (10) and a second mechanical element (12) with respect to each other, with a first measurement unit (14) for positioning at the first mechanical element, a second measurement unit (18) for positioning at the second mechanical element, a camera (36), and an analysis unit (22),
wherein the first measurement unit is configured and arranged for producing at least one light beam bundle (28, 30) and a scattering surface (34) for the scattering of light (WV, PV) impinging on the scattering surface,
wherein the second measurement unit has a reflector arrangement (38), which faces the first measurement unit when the measurement units are positioned at the respective mechanical element so as to reflect the light beam bundle onto the scattering surface,
wherein the camera is configured and arranged to move freely with respect to the two measurement units and is designed for taking images of the scattering surface,
and wherein the analysis unit is configured and arranged to determine from image data supplied by the camera the position of impingement of the light beam bundle (28', 28"), reflected at the reflector arrangement, onto the scattering surface and from it the location of the first mechanical element and the second mechanical element with respect to each other.

5. The device according to claim 1, wherein the reflector arrangement (38) has a first rearward surface (42) and a second rearward surface (44), which are arranged at an angle with respect to each other, so as to reflect the light beam bundle from the first rearward surface to the second rearward surface and from there in the direction of the scattering surface (34).

6. The device according to claim 5, wherein the first rearward surface (42) and the second rearward surface (44) of the reflector arrangement (38) are roughly perpendicular with respect to each other or in that the first rearward surface (42) and the second rearward surface (44) of the reflector arrangement (38) are roughly perpendicular with respect to each other and the reflector arrangement (38) is configured and arranged as a prism or as a Porro prism or as a triple prism.

7. The device according to claim 5, wherein a surface (40) of the reflector arrangement (38) facing the first measurement unit (14) is configured and arranged to reflect a portion of the light beam bundle (28) to the scattering surface and to transmit a portion of the light beam bundle to the first rearward surface.

8. The device according to claim 1, wherein the light beam bundle is a first light beam bundle (28) and the means for producing the first light beam bundle are designed also for producing a second light beam bundle (30), with the two light beam bundles being radiated essentially in the same direction, but differing spectrally, with a surface (40) of the reflector arrangement (38) facing the first measurement unit being designed as a color separator and thereby being more strongly reflecting for the first light beam bundle than for the second light beam bundle and more strongly transmitting for the second light beam bundle than for the first light beam bundle, with at least one first rearward surface (42) of the reflector arrangement being provided in order to reflect the transmitted second light beam bundle through the surface facing the first measurement unit.

9. The device according to claim 1, wherein the first mechanical element is a first shaft (10) and the second mechanical element is a second shaft (12), with the first measurement unit (14) being configured and arranged for positioning at a peripheral surface of the first shaft and the second measurement unit (18) being configured and arranged for positioning at a peripheral surface of the second shaft.

10. The device according to claim 9, wherein the analysis unit (22) is configured and arranged to determine the angular offset and the vertical and horizontal offset of the shafts from image data recorded in different rotational angle positions of the shafts (10, 12).

11. The device according to claim 6, wherein a roof edge (46) of the prism (38) is oriented essentially tangential with respect to the shaft peripheral surfaces.

12. The device according to claim 1, wherein the camera has a lens (35) with fixed focus and/or in that the analysis unit (22) is configured and arranged to rectify the image data supplied by the camera (36) with respect to a tilting to the scattering surface (34) and/or in that the first measurement unit (14) has an inclinometer (27) and/or in that the camera (36) has an inclinometer (29) and/or in that the first measurement unit (14) has a backlighting (25) for the scattering surface (34) and/or in that the camera (36) is configured and arranged (23) for illumination of the scattering surface (34) and/or in that the camera (36) is configured and arranged as a smartphone.

13. The device according to claim 1, wherein the scattering surface (34) is provided with measurement markings (50) and/or in that the scattering surface (34) is provided with a plurality of graphic codes (60A, 60B, 60C, 60D), distributed over the scattering surface, for coding of data regarding the scattering surface and/or the measurement unit provided with the scattering surface.

14. A method for determining the location of a first mechanical element (10) and a second mechanical element (12) with respect to each other, comprising the steps of:
    positioning a first measurement unit (14) at the first mechanical element;
    positioning a second measurement unit (18) at the second mechanical element;
    producing a light beam bundle (28, 30) by the first measurement unit;
    reflecting the light beam bundle by a reflector arrangement (38) of the second measurement unit onto a scattering surface (134) of the first measurement unit;
    bringing a camera (36), which can move freely with respect to the two measurement units, into position and taking at least one image of the scattering surface; and
    analyzing the at least one image to determine the position of impingement (WV, PV) of the light beam bundle, reflected at the reflector arrangement, on the scattering surface and from it the location of the first mechanical element and the second mechanical element with respect to each other.

15. The method according to claim 14, further comprising the step of:
    directing the camera (36) onto the side of the scattering surface (134) facing the reflector arrangement (38) or configuring the scattering surface (134) as a matt screen and directing the camera (36) onto the side of the matt screen facing away from the reflector arrangement (38).

* * * * *